J. J. WOLF, Jr.
CAMERA.
APPLICATION FILED JULY 30, 1920.
1,374,794.
Patented Apr. 12, 1921.
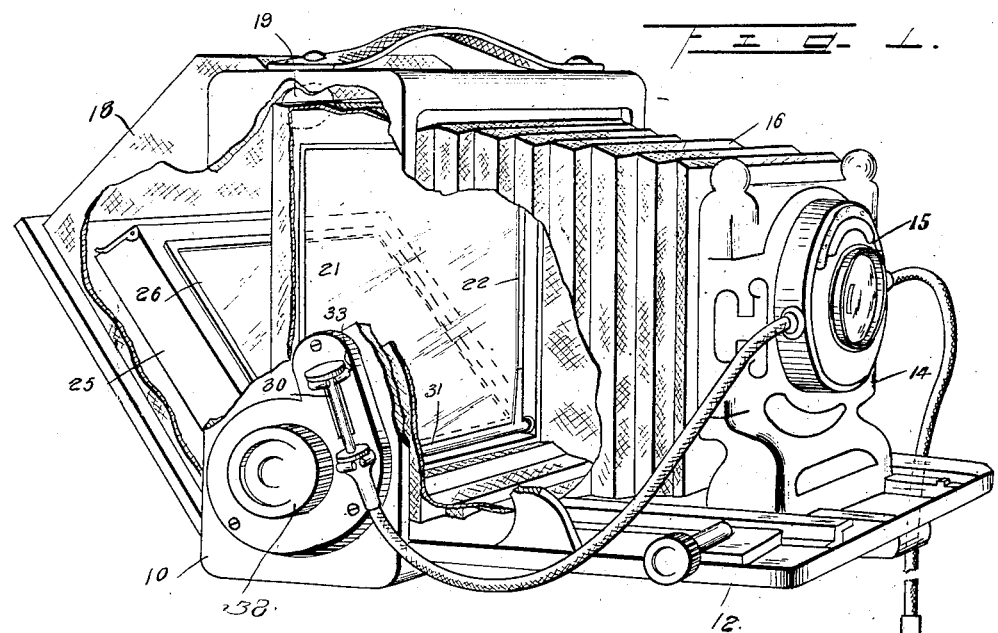
Fig. 1.
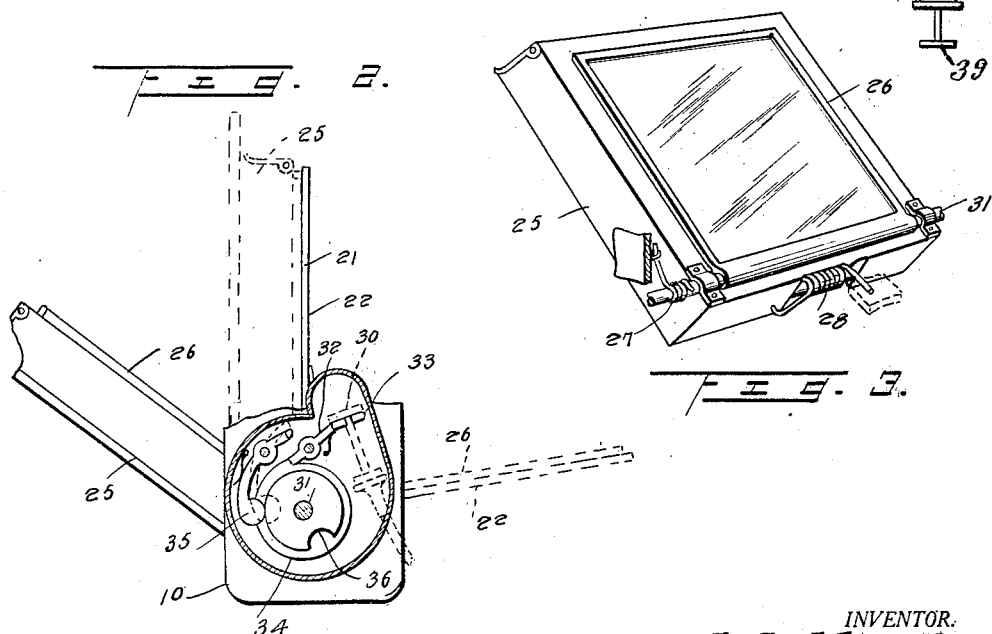
Fig. 2.
Fig. 3.
INVENTOR.
J. J. Wolf Jr.
BY
ATTORNEY.

UNITED STATES PATENT OFFICE.

JACOB J. WOLF, JR., OF NEW ORLEANS, LOUISIANA.

CAMERA.

1,374,794.   Specification of Letters Patent.   Patented Apr. 12, 1921.

Application filed July 30, 1920. Serial No. 400,216.

*To all whom it may concern:*

Be it known that I, JACOB J. WOLF, Jr., a citizen of the United States, residing at New Orleans, in the parish of Orleans and State of Louisiana, have invented certain new and useful Improvements in Cameras; and I do hereby declare the following to be a full, clear, and exact description of the invention, such as will enable other skilled in the art to which it appertains to make and use the same.

This invention relates to a camera, and more particularly to means for assisting the operator to obtain the proper focus.

The object is to provide, in connection with a ground glass plate for receiving the image, a swingingly mounted mirror adapted to be positioned at an angle with the ground glass, in order that the image may be observed through an opening in the upper portion of the hood, the image appearing in full size and in upright position.

A further object is to provide a film pack holder, a mirror constituting the front of the holder, and means causing the holder to swing from a lower position to upper operative position.

A still further object is to provide, in connection with the elements specified, means for mounting the film holder, the mirror and the ground glass, so that the former shall move to operative position, at the proper time, and the mirror and ground glass shall at approximately the same moment move forwardly to inoperative position.

A still further object is to provide for the movement of these elements, in the manner specified, prior to the operation of the shutter, the plunger controlling the operation of the shutter being retained in inoperative position until freed by the operation of means releasing the film holder and associated elements.

With the foregoing and other objects in view, the invention consists in the novel construction, combination, and arrangement of elements hereinafter described and claimed.

In the accompanying drawing:

Figure 1 is a perspective view of the camera, with parts broken away.

Fig. 2 is a fragmentary view in vertical section and side elevation, certain of the elements being shown in dotted lines as having moved to the position assumed just before operating the shutter.

Fig. 3 is a perspective view showing the film pack holder, the mirror covering the front portion thereof, and the springs for moving these elements upwardly.

In carrying out my invention, I provide a casing 10, a supporting element 12, a front portion 14 on which the casing 15 of the shutter is mounted, a bellows 16, and a hood 18. The hood is provided with an upper opening 19 through which the image is observed.

The ground glass 21 is mounted in a frame 22, and is designed to swing forward to inoperative position, as shown in dotted lines in Fig. 2, after the focusing operation.

The film pack holder is shown at 25, and a mirror 26 constitutes the front of the holder, springs 27 and 28 serving the purpose indicated below.

The shaft 31 is rotatably mounted in the casing and the frame of the mirror is rigid with reference to the shaft, the pack holder 25 being mounted to swing on the shaft. A spring held trip or pawl 32 is provided with a loop portion 33 for retaining the plunger 30, and slight initial pressure on the plunger and therefor on trip 32 throws the operative end of the latter out of engagement with a notched disk 34, permitting the mirror to move upwardly under the action of the spring 27, effecting partial rotation of the shaft 31 on which the mirror is fixedly mounted. This releases the film holder which closely follows the mirror under the action of the spring 28, which may be of slightly greater strength than spring 27, so that there will be no possibility of a gap occurring between the film holder and mirror. The mirror moves forwardly and carries the ground glass to the dotted line position of Fig. 2, the film holder remaining in a vertical position.

Pawl 35 then moves to the dotted line position engaging the notch 36 and permitting the trip 32 to pass the upper end of the pawl 35 and therefore permitting the full operation of the plunger for opening the shutter. The initial movement of the plunger was limited because of the limited movement permitted element 32 while the pawl 35 remained in the full line position of Fig. 2. This arrangement prevents the release of the shutter before the film is in position and the mirror and focusing glass have moved to inoperative position. The operator moves the elements to the position shown in Fig. 1 by means of knob 38 on shaft 31. Another plunger 39 on the opposite side may be used for retaining the shutter open during the operation of focusing.

It will be observed that the operator is enabled to adjust the focus up to the instant the picture is taken, this being one of the chief aims of the invention.

Having thus described the invention, what I claim is:—

1. In a device of the class described, a focusing glass, means for mounting the latter to swing on a horizontal axis, a mirror mounted to swing rearwardly from the lower portion of said glass, and a film holder mounted in the rear of the mirror and adapted to swing on said horizontal axis.

2. In a device of the class described, a focusing glass, means for mounting the latter and permitting it to swing forwardly to approximately horizontal position, a mirror mounted to swing rearwardly on a horizontal axis in the rear of the glass, a film holder mounted to swing in the rear of the mirror, and resilient means for effecting the swinging movement of the film holder.

3. In a device of the class described, a focusing glass, a mirror mounted to swing rearwardly and downwardly therefrom on a horizontal axis, and a resilient device to be placed under tension and acting to swing the mirror upwardly for carrying the focusing glass forwardly to inoperative position.

4. In a device of the class described, a focusing glass, means for mounting the latter permitting the glass to be swung forwardly to inoperative position in an approximately horizontal plane, a mirror mounted to swing rearwardly from the focusing glass, a spring to be placed under tension and adapted when released to swing the mirror upwardly into engagement with the mounting means of the focusing glass and to carry the latter forward to inoperative position.

5. In a device of the class described, a focusing glass, mounting means therefor adapted for movement forwardly to inoperative position in an approximately horizontal plane, a mirror mounted to swing with reference to the mounting means of the focusing glass, a spring for effecting the swinging movement of the mirror in a forward direction for carrying forward the focusing glass and the mounting means therefor, and means for holding the mirror, focusing glass and mounting means therefor against movement.

6. In a device of the class described, a focusing glass, means for mounting the latter to swing on a horizontal axis, a mirror mounted to swing on said horizontal axis, a film holder similarly mounted, a spring to be placed under tension for moving the film holder about its axis and in upward direction and for moving the mirror in a forward direction for carrying forward the focusing glass, and means for retaining and releasing the film holder, mirror and focusing glass.

7. In a device of the class described, a focusing glass mounted to swing on a horizontal axis, a mirror mounted to swing rearwardly from the lower portion of the glass, means for moving said mirror and glass forwardly to inoperative position, shutter controlling means, and devices for rendering the shutter controlling means inoperative prior to the movement of the mirror and focusing glass to inoperative position.

8. In a device of the class described, a focusing glass mounted to swing on a horizontal axis, a mirror mounted to swing rearwardly from the lower portion of the glass, means for moving said mirror and glass forwardly to inoperative position, shutter controlling means, and a plurality of pivoted devices for rendering the shutter controlling means inoperative prior to the movement of the mirror and focusing glass to inoperative position.

9. In a device of the class described, a focusing glass mounted to swing on a horizontal axis, a mirror mounted to swing rearwardly from the glass, means for moving said mirror and glass forwardly to inoperative position, shutter controlling means, and inter-dependent engaging devices for rendering the shutter controlling means inoperative prior to the movement of the mirror and focusing glass to inoperative position.

10. In a device of the class described, a focusing glass, means for mounting the latter to swing on a horizontal axis, a mirror mounted to swing rearwardly from said glass, a film holder mounted in the rear of the mirror and adapted to swing on said horizontal axis, means for actuating the film holder, shutter controlling means, and devices for rendering the latter inoperative prior to the movement of the film holder to operative position.

In testimony whereof I affix my signature in presence of two witnesses.

JACOB J. WOLF, Jr.

Witnesses:
HARRY HEREFORD,
GEO. E. PEARCE.